April 28, 1959   C. F. PULVARI   2,884,617
METHODS AND APPARATUS FOR RECORDING AND
REPRODUCING INTELLIGENCE
Filed Sept. 21, 1953   6 Sheets-Sheet 1
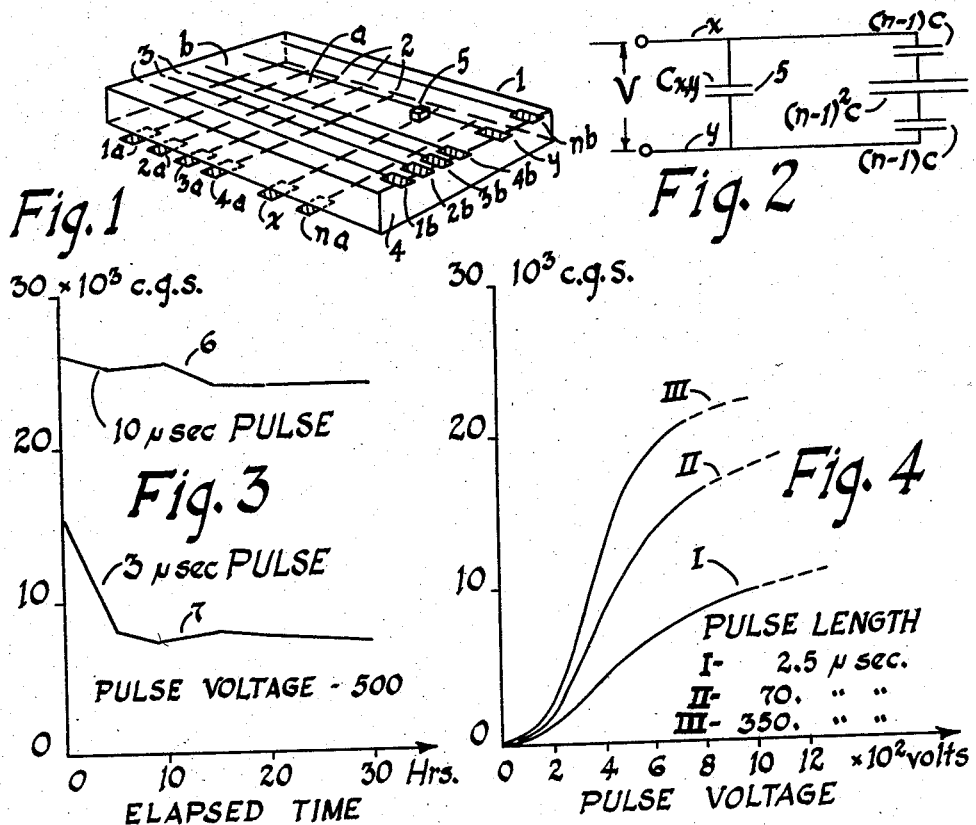
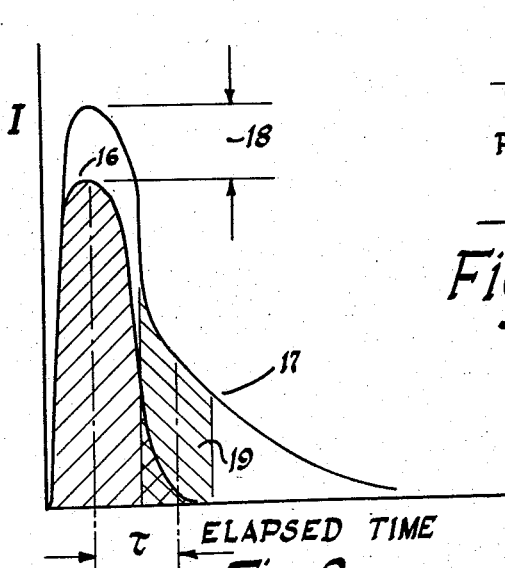
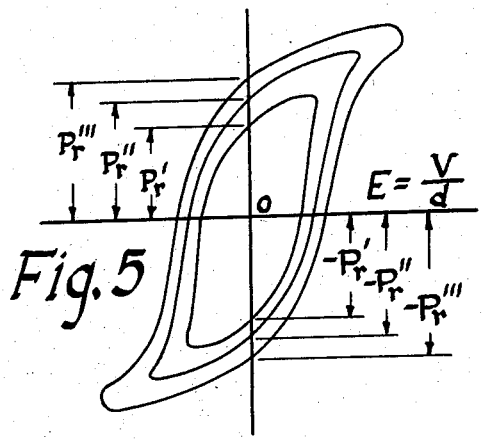
INVENTOR.
Charles F. Pulvari
BY
ATTORNEYS

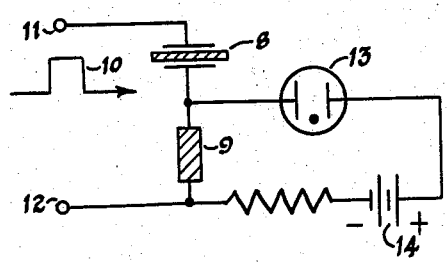
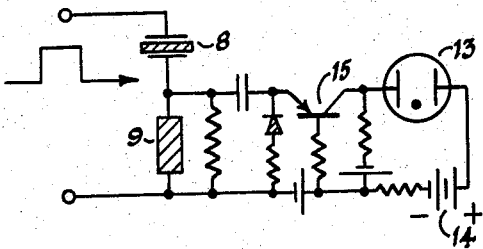
Fig. 6  Fig. 7
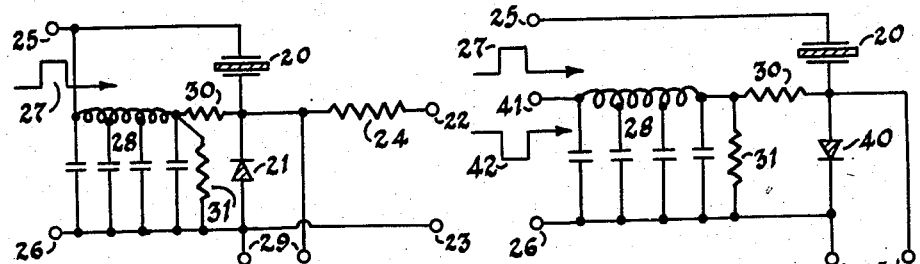
Fig. 9  Fig. 11
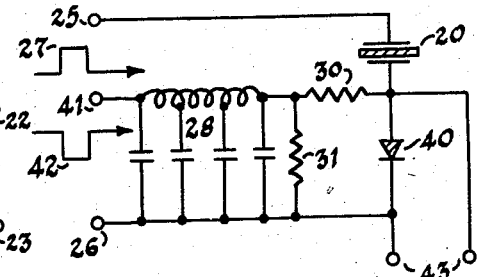
Fig. 10
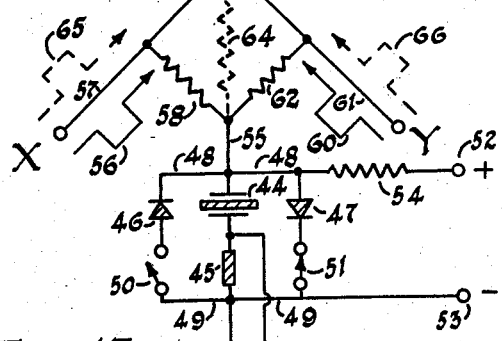
Fig. 13
INVENTOR.
Charles F. Pulvari April 28, 1959

C. F. PULVARI 2,884,617

METHODS AND APPARATUS FOR RECORDING AND
REPRODUCING INTELLIGENCE

Filed Sept. 21, 1953

INVENTOR.
Charles F. Pulvari
BY
ATTORNEYS

INVENTOR.
Charles F. Pulvari

INVENTOR.
Charles F. Pulvari

United States Patent Office 2,884,617
Patented Apr. 28, 1959

2,884,617

METHODS AND APPARATUS FOR RECORDING AND REPRODUCING INTELLIGENCE

Charles F. Pulvari, Washington, D.C.

Application September 21, 1953, Serial No. 381,347

20 Claims. (Cl. 340—173)

This invention relates generally to methods and apparatus for recording and reproducing intelligence and more particularly to methods and apparatus for recording and reproducing intelligence, such as bits of information, of the binary digit or yes or no type, wherein it is desired to be able to record and store such intelligence and then reproduce part or all of it at a later time, and to be able to repeat the action of record, storing and reproducing for subsequent amounts of such intelligence as desired. Apparatus capable of doing this has been referred to as memory apparatus since, in effect, the apparatus is capable of remembering what has been put into it and will deliver up its information when "asked" in the right manner.

Modern technology presents many fields of use for a memory apparatus which is thoroughly reliable in remembering what has been put into it and practically instantaneous in its recording and reproducing action. One example of a field where methods and apparatus according to my invention have special utility is the field of high-speed computing. Of course, other fields will be obvious to those skilled in the art.

There is a continuing problem in the field of high-speed computing of providing computer and memory elements which are smaller and more reliable than those in present use. When it is realized that a high-speed computing apparatus, if it is to be satisfactory, must be able to handle practically instantaneously highly complex problems which necessitate feeding into and obtaining from the apparatus substantial amounts of information, it is apparent that the apparatus can involve many individual elements which make up the complete apparatus. Therefore, the smaller the elements and the lower in cost they are, the more economical will be the complete apparatus.

However, in addition to the problem of economical storage of information, there is also the equally important problem of being able to get information into and out of the apparatus practically instantaneously. This may be referred to as a problem of selection or switching. Computer and memory elements should have characteristics such that a random selection of the storage element can be easily performed. In other words, the storage element must be provided with the "proper" non-linearity. Broadly speaking, any element which has two stable states may be used as a computer element. From a practical standpoint the element must be capable of high-speed flip-flop which, in turn, usually means that it is capable of being actuated by ultra high-speed electrical pulses. Ferroelectric materials in general, and barium titanate in particular, have been found to be particularly adapted for use as computer elements since they possess dipole characteristics which enable high-speed flip-flop to be achieved in response to pulse actuation. However, other elements such as transistor elements and even certain magnetic elements possess sufficient non-linearity so as to be capable of high-speed flip-flop and thus be adapted for use as computer elements.

In my copending application Serial No. 145,361, now Patent No. 2,793,288, filed February 21, 1950, I disclose multidimensional multicondenser memory devices employing memory elements of ferroelectric material, such as barium titanate. The devices disclosed in said copending application may be considered as representing different types of ferroelectric memory matrices wherein the ferroelectric material memory elements, such as barium titanate, have nearly rectangular hysteresis loops. The memory elements may be considered as being located at cross-points of the matrix.

With matrix arrangements such as are shown in my copending application identified above, it is possible to achieve a two-to-one selection ratio which may be improved to about three-to-one by applying an electrostatic compensating potential as is also disclosed in said copending application. The selection ratio of a switching matrix may be defined as the ratio of the potential acting on a selected cross-point to the highest potential appearing on any of the unselected matrix cross-points. In other words, the selection ratio is a measure of how effectively one can act upon a particular cross-point without obtaining an unwanted signal from one or more of the other cross-points which are not being acted upon. Since a switching matrix can contain many cross-points, each of which can be a seat of information, it is obviously desirable to be able to seek out that one particular cross-point from which information is sought without having its neighbors interfering with the desired action. Thus, in an ideal matrix it would be desirable that the pulses applied to a particular row and column should act on the selected cross-point only and that there should be substantially no action on the unselected cross-points. From the standpoint of electrical operation, voltages appearing on unselected cross-points may be defined as being matrix disturbances.

It is apparent therefore that one of the very real problems in regard to memory matrices is improving the selection ratio so that one can act on a selected cross-point substantially to the exclusion of all other cross-points of the matrix. Furthermore, it would seem that this would require the use, as a matrix element, of a material having a substantially rectangular hysteresis loop since such a material has a sufficient degree of non-linearity to provide good flip-flop action. Thus, a ferroelectrical material, such as barium titanate, having a single crystal structure, has been found to have such properties. However, from the standpoint of greater availability, sufficient reliability, lower over-all cost and thus more economical storage of information, the favorable memory properties found in highly oriented ceramics generally make it desirable to be able to use these materials as memory elements instead of using only materials which have substantially rectangular hysteresis loops. The overall crystal orientation of a ceramic material may be defined as the ratio of the measured remanent polarization of the ceramic near breakdown.

While it is true that such a highly oriented ceramic material does not have as sharp a break in its polarization characteristic curve as does a ferroelectric material with single crystal structure, I have found that the problem of providing sufficient non-linearity insofar as the action of the storage elements is concerned can be solved by providing a switching matrix having a high selection ratio. Therefore, where the material of which the memory elements are made does not itself possess sufficient non-linearity to be fully selective, the problem becomes one of switching; i.e., providing non-linearity through switching so that the combination of the material and the switching matrix provides the required non-linearity to achieve the necessary high-speed selective flip-flop action demanded in a satisfactory high-speed computer. The combination insures that each information storage element can "flip-flop" practically instantaneously without affecting the other information storage elements.

It is therefore an object of my invention to provide new and improved methods and apparatus for recording and reproducing intelligence wherein it is possible to utilize intelligence storing elements made of materials which do not necessarily have extremely sharp non-linear characteristics.

It is another object of my invention to provide such methods and apparatus whereby a high selection ratio is obtained so that, in an apparatus having many intelligence storing elements, it is possible to act on one element to the substantial exclusion of all other elements.

It is a further object of my invention to provide new and improved switching matrices for use in an apparatus for recording and reproducing intelligence.

It is another object of my invention to provide new and improved scanning methods and apparatus for use in recording and reproducing intelligence.

It is another object of my invention to provide such methods and apparatus wherein it is possible to obtain a visual indication of the intelligence being recorded and/or reproduced.

Broadly speaking, in one manner of practising my invention, I record or write intelligence in a plurality of intelligence storing elements by applying extremely short duration electrical pulses to these elements. Each pulse may have a duration as short as a fraction of a microsecond and the elements utilized as intelligence storing elements are preferably made of ferroelectric material. When a single pulse, or a plurality of pulses, are applied to a particular element, it becomes remanently polarized in one direction and will retain the intelligence put into it for a very long period of time.

I reproduce or read out the intelligence thus stored by applying opposite polarity extremely short duration electrical pulses to the intelligence storing elements. This reading out operation may be performed sequentially or at random or by the combination of both and may involve applying a single read out pulse to a particular element or a combination of pulses simultaneously to said element. By requiring two, three or more opposite polarity pulses to be imposed upon a particular intelligence storing element in order to obtain a read out signal from that element, it is possible to obtain a very high selectivity in the reading out operation so that, for all practical purposes, only the element which is being acted upon will respond and give a read out signal.

In another method of practising my invention, I polarize a particular intelligence storing element in one direction so that it contains recorded intelligence, this being accomplished by means of an electrical pulse or pulses. I then reproduce the intelligence bit by bit by applying an opposite polarity electrical pulse, or pulses simultaneously, to the intelligence storing element but the applied pulse causes only a partial reversal of the remanent polarization of the element. I am therefore able to successively act upon a particular element with pulses of lower intensity than the recording or writing pulse and thus obtain a plurality of readings before the remanent polarization of the element is completely switched or reversed.

One form of apparatus used in the practice of my invention comprises a matrix having a plurality of sets of electrically conductive strips therein. Said sets of strips are so arranged with respect to each other that they define what can be termed as a plurality of cross points, i.e., a strip of one set crosses over a strip of another set and is slightly spaced therefrom at the cross-over location. Ferroelectric material is located between the aforementioned strips at these cross-over or cross point locations and is electrically connected to each strip so that there are, in effect, a multitude of small condensers.

A scanning apparatus is connected to the input leads of the sets of strips and this scanning apparatus is capable of transmitting ultra-high speed electrical pulses to the matrix cross points so that all or a desired number of cross points can be polarized in a particular direction to record or write intelligence into the matrix. Then the scanning apparatus can be used to reproduce or read out the recorded intelligence by again transmitting ultra-high speed electrical pulses to the selected cross points and causing them to reverse, or switch, their remanent polarization.

A switch in remanent polarization produces a pulse of electrical current which is fed to a suitable output circuit. I provide a number of types of output circuits, one of which involves a time delay line which causes a coincidence of electrical pulses to act upon a voltage responsive member to produce a signal if switching has occurred in a particular intelligence storing element. Another type of output circuit involves a filter arrangement which provides an extremely high signal to noise ratio.

Other objects and advantages of my invention become apparent from the following detailed description taken in conjunction with the detached drawings in which:

Fig. 1 is a schematic showing of a memory matrix having two sets of conductive strips disposed substantially at right angles to each other and defining a plurality of cross points;

Fig. 2 shows the equivalent circuit for the matrix shown in Fig. 1;

Fig. 3 is a graph showing decay of remanent polarization as a function of pulse duration;

Fig. 4 is a graph showing remanent polarization curves;

Fig. 5 is a graph showing hysteresis curves obtained for different maximum values of electric fields;

Fig. 6 shows a basic circuit according to my invention incorporating a bistable ferroelectric circuit element;

Fig. 7 shows a circuit similar to that of Fig. 6 but including a transistor as an indicating element;

Fig. 8 is a graph showing current transients obtained when a pulse voltage is applied to a bistable ferroelectric circuit element depending upon whether switching occurs in said element;

Fig. 9 shows a multicoincidence circuit according to one embodiment of my invention;

Fig. 10 shows a circuit similar to that of Fig. 9 including a transistor as part of the circuit;

Fig. 11 shows an anti-coincidence circuit according to another embodiment of my invention;

Fig. 13 shows a circuit, partly schematic, associated with one cross-point of a three-dimensional memory matrix;

Figure 14:
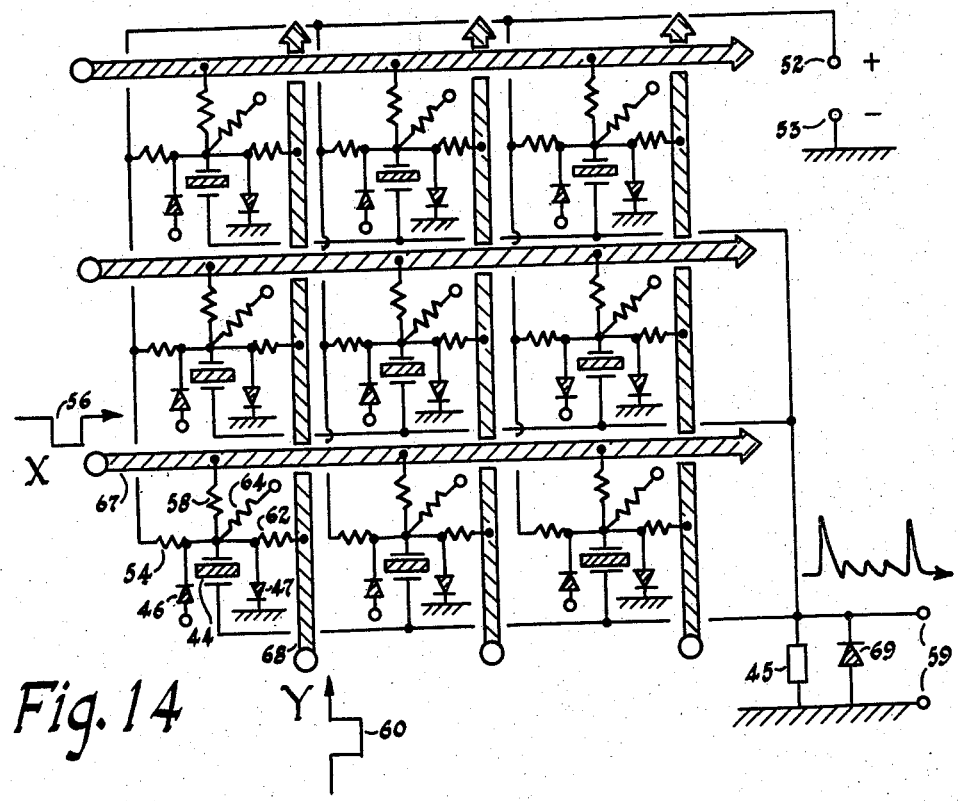
Fig. 14 is a schematic circuit diagram of a three-dimensional memory matrix having a plurality of cross-points of the type shown in Fig. 13.

As has been mentioned above, one of the principal problems encountered in connection with a recording and reproducing apparatus utilizing a plurality of storage, or memory, elements into which the information to be recorded is put and from which such information is to be obtained, is the problem of being able to put a bit of information into one element and to take it from that element without affecting the other elements and particularly those adjacent to the selected element. The reasons why this problem exist will become more apparent from a consideration of Figs. 1 and 2 of the drawings.

Fig. 1 shows a memory matrix, indicated generally by the reference numeral 1, which comprises a set of parallel electrically conductive strips 2 disposed substantially at right angles to a corresponding set of parallel electrically conductive strips 3. Conductive strips 2 may be described as being located substantially in plane $a$ while conductive strips 3 are located substantially in plane $b$. Thus, the respective sets of strips 2 and 3 are not only located substantially at right angles to each other but are also located in planes spaced apart from each other. When the space between the sets of strips 2 and 3, or rather between planes $a$ and $b$, is filled with a dielectric material 4, the conductive strips form a plurality of condensers, or simply cross-points, one of which is indicated at 5 in Fig. 1. There are therefore a plurality of cross-points or memory elements available to receive information and store it.

Again referring to Fig. 1, it will be seen that, starting from the left, there are four conductive strips indicated as $1a$, $2a$, $3a$ and $4a$, since all of these strips are located substantially in plane $a$. The final strip is indicated as the $n$th strip where $n$ represents the total number of strips that happen to be located in plane $a$. Of course, $n$ can be any number depending upon the number of strips which are located in the plane. Similarly, in plane $b$, conductive strips are indicated, starting from the left, as $1b$, $2b$, $3b$, $4b$ and finally $nb$ where $n$ represents the total number of strips in that plane. Between any selected strip in plane $a$ and any selected strip in plane $b$ there will be a cross-point or condenser. Thus, the cross-point or condenser 5 is shown as being located between conductive strips $x$ in plane $a$ and $y$ in plane $b$. Hence, $x$ represents any selected conductive strip in plane $a$ and $y$ represents any selected conductive strip in plane $b$.

Referring now to the equivalent circuit shown in Fig. 2, it will be observed that the selected cross-point or condenser 5 has been indicated as having the capacitance C$x$, $y$. If a voltage V is applied to conductive strips or leads $x$ and $y$, then cross-point or condenser 5 has the full amount of voltage V applied to it. All of the other groups of condensers or cross-points connected to conductive strips or leads $x$ and $y$, and for which the capacitance can be stated as being $(n-1)C$, will have a voltage applied thereto somewhat less than $$\frac{V}{2}$$

Finally, cross-points or condensers located in the remaining part of the matrix shown in Fig. 1 and which have a capacitance $(n-1)^2C$ also produce a voltage drop but this particular voltage drop is practically negligible. All of this is shown in the right-hand portion of the equivalent circuit shown in Fig. 2 where the groups of condensers or cross-points connected to leads $x$ and $y$ are shown as having a capacitance $(n-1)C$ and all of the others are shown as having a capacitance $(n-1)^2C$.

The equivalent circuit of Fig. 2 shows that any time a selected condenser or cross-point 5 is acted upon by a given voltage V, the other condensers or cross-points connected to the leads between which the selected condenser is located are also acted upon by a voltage which is nearly half of that acting upon the selected condenser. In other words, there is practically a 1:2 voltage ratio obtained in the memory matrix between a selected and an unselected cross-point. Although this ratio may be improved to about 1:3 by applying an electrostatic compensating potential as is described in my copending application Serial No. 145,361 filed February 21, 1950, this is about as selective as the matrix can be. Furthermore, the type of memory matrix shown in Fig. 1 requires a type of ferroelectric material like a crystalline barium titanate which has a nearly rectangular hysteresis loop, i.e. a material having single crystal structure.

In addition to improving the selection ratio of a memory matrix far beyond the 1:2 ratio described above, it is also desirable to be able to utilize a material for the cross-point or condenser material which does not necessarily have a substantially rectangular hysteresis loop. Since a polycrystalline material such as highly oriented ceramic material has good memory properties and is much more readily available than a single crystal material, it is more economical to use these highly oriented ceramics. The over-all crystal orientation may be defined as the ratio of the measured remanent polarization of a ceramic near breakdown as compared to the maximum remanent polarization obtainable in a single crystal.

Fig. 3 shows the decay of remanent polarization as related to pulse duration for a highly oriented ceramic material such as recrystallized barium titanate ceramic. In Fig. 3, line 6 shows the decay in remanent polarization where the ceramic material was polarized by an average voltage of 500 volts applied to it in 10 microsecond pulses. Line 7 shows a similar decay line where the pulse voltage was applied in 3 microsecond pulses. It will be observed that, after an initial drop-off, the remanent polarization remains fairly constant over a long period of time. In the graph shown in Fig. 3, the ordinate is polarization in centimeter-gram-second units and the abscissa is given in hours.

While the remanent polarization curve of a polycrystalline highly oriented ceramic material such as barium titanate is not as non-linear as the remanent polarization curve of a similar material having a single crystalline structure, the remanent polarization curve of the recrystallized structure does follower a higher order exponential law particularly in the low voltage region. This can be observed from Fig. 4 where three remanent polarization curves are indicated by the Roman numerals I, II and III. Thus, curve I is the remanent polarization curve for a highly oriented ceramic material; i.e., a ferroelectric material such as recrystallized barium titanate, where voltage was applied to the material in pulses having a 2.5 microsecond duration. Curves II and III are for voltages applied in pulses having 70 microsecond duration and 350 microsecond duration respectively. In Fig. 4, the ordinate is polarization in centimeter-gram-second units and the abscissa is in voltage units.

It is apparent from a consideration of Fig. 4, and this will be confirmed also by viewing Fig. 5, that the remanent polarization curve of a recrystallized ferroelectric material, such as barium titanate, has a certain degree of non-linearity. I take advantage of this property of such materials by incorporating them in a memory apparatus having a high selection switching matrix which acts to properly select the cross-point or condenser into which it is desired to put information or from which it is desired to take or read out information.

Mention has been made heretofore of hysteresis loops and substantially rectangular hysteresis loops in connection with memory elements made of ferroelectric materials like barium titanate. Fig. 5 shows a family of three dielectric hysteresis curves where each curve is shown as having two opposite limiting values of polarization, these being $P'r$ and $-P'r$ for the inner curve, $P''r$ and $-P''r$ for the middle curve, and $P'''r$ and $-P'''r$ for the outer curve. Switching of the polarization from one limiting value to the opposite limiting value by an external field may be described as a molecular snap action and corresponds to the "flip-flop" operation desired in computing circuits or information-storage devices. Because of this property of ferro-electric materials, such as barium titanate, they have found use in recording and reproducing apparatus of the memory type where it is desired to store information. An important point as regards the utility of such ferroelectric materials as memory elements; i.e., as elements particularly adapted for use in recording and reproducing apparatus, is that they may be used as small inexpensive bistable circuit elements capable of ultra high-speed operation and remarkable memory properties.

Figs. 6 and 7 show what can be considered as basic circuits in a recording and reproducing apparatus employing bistable memory elements such as condensers made of materials having ferro-electric properties. These circuits are basic in the sense that they represent one unit of a multi-unit apparatus or, to put it another way, one memory element or condenser circuit of a multi-memory element or multi-condenser circuit. In both Fig. 6 and Fig. 7, the reference numeral 8 represents a memory element in the form of a condenser comprising a material having properties such that it is capable of a molecular snap action or "flip-flop" when, for example, it is polarized in one direction and an opposite polarity pulse is applied to it which causes a substantially instantaneous reversal of polarity. In both Fig. 6 and Fig. 7, the load impedance 9 may be any type of series impedance like a resistance, inductance, or capacitance, or a combination thereof, the selection of the type of load impedance being governed by the type of circuit with which the unit circuit of Fig. 6 or Fig. 7 is to be used.

Referring now more specifically to Fig. 6, it will be assumed that the remanent polarization of element 8 is $-P_r$. If a positive electrical pulse 10 of sufficient amplitude is applied to the terminals 11 and 12, the remanent polarization of element 8 will be switched from $-P_r$ to $+P_r$ and the switch in remanent polarization causes a relatively large displacement current to flow through the series load impedance 9. If a negative pulse is applied to the input terminals 11 and 12, the displacement current which flows through series load impedance 9 will be small because the remanent polarization of element 8 has the same sign as the applied pulse and no switching or "flip-flop" occurs. Thus, this basic circuit is capable of responding to pulses of predetermined polarity and of remembering the polarity of the pulse previously received. Such a property is the basic requirement of an element, or memory element, adapted to be used in a recording and reproducing apparatus.

Again referring to Fig. 6, a gaseous discharge tube 13 is biased close to its ignition potential by a battery 14 and is connected across the series load impedance 9. If the applied electrical pulse 10 causes a switching or "flip-flop" of the remanent polarization in element 8, the voltage drop across the series load impedance, caused by the displacement current resulting from switching or "flip-flop," ignites or extinguishes tube 13 depending upon the polarity of the bias on the tube, the direction of the displacement current and of course the initial condition of the tube.

Since a relatively long electrical pulse is required to activate a gas discharge tube, the indicating device to be activated by the displacement current which occurs upon switching or "flip-flop" of the memory element may preferably be a circuit element which is capable of acting much more rapidly than a gas discharge tube per se. Thus, Fig. 7 shows an indicating circuit which incorporates a bistable transistor 15. As is well known to those skilled in the art, the properties of such a transistor enable it to act very rapidly in response to a pulse signal and it, with its associated gas discharge tube 13, can furnish a very rapid indication of whether or not switching of polarity has occured in element 8. The circuits shown in Figs. 6 and 7 are capable of producing an indication of whether or not switching of polarity has occurred in the memory element in a time period as small as one microsecond or even less. It is obvious therefore that, being capable of such ultra-high speed operation, these basic circuits may be incorporated in recording and reproducing apparatus capable of use for high speed computing purposes, among other purposes.

Analysis of the electrical current transients which occur when an electrical pulse is applied to a bistable memory element such as a condenser comprising a material having ferro-electric properties, reveals that two types of transient may occur. One type of transient occurs if there is no switching or "flip-flop" of the polarization of the memory element or condenser, i.e., if the electrical sign of the applied pulse is the same as that of the remanent polarization of the memory element, and the other type of transient occurs if there is switching or "flip-flop," i.e., where the electrical sign of the applied pulse is opposite from the polarity of the remanent polarization. Fig. 8 is a graph in which the ordinate is electrical current I and the abscissa is in units of time T. The curves shown in Fig. 8 may be derived from the basic circuits of Figs. 6 and 7 in that these curves represent current flow through the series load impedance 9 depending upon whether or not element 8 is switched in polarization.

The curve 16 in Fig. 8 represents the current transient, i.e., electrical current which flows through the series load impedance 9, when the remanent polarization of element 8 is not switched. This can be called an elastic transient since the electrical pulse, being of the same electrical sign as the remanent polarization merely, in effect, stretches this polarization farther in the same direction momentarily whereupon it returns substantially to its original value.

When the electrical pulse 10 causes switching or "flip-flop" of the remanent polarization in element 8, the current transient is substantially larger. Curve 17 in Fig. 8 shows this transient and it may be called a switching transient since there has been a change in the remanent polarization of the memory element 8. It is apparent from a comparison of transient curves 16 and 17 that the elastic transient is a shorter time transient and has a lower amplitude than the switching transient. Not only does the switching transient have a greater amplitude and a longer time duration but it obviously also bounds a bigger area as viewed in Fig. 8. The elastic transient may be considered as being caused by the elastic dipoles present in element 8 and the switching transient may be considered as being caused by the snapping dipoles present in this element. For further discussion relative to the theory of such dipoles, reference is made to my article in the Proceedings of the Western Computer Conference (published by the I.R.E. June, 1953) entitled "The Snapping Dipoles of Ferro-electrics as a Memory Element for Digital Computers."

Again referring to Fig. 8, it will be noted that curves 16 and 17 substantially coincide during their rising portions, i.e. left-hand portions as viewed in Fig. 8. This may be described as stating that the switching transient 17 follows the leading edge of the elastic transient 16 and this indicates that the elastic transient is always incorporated in or is an accompanying phenomena of the switching transient. The fact that the switching transient is bigger and longer in time duration than the elastic transient is utilized by me in distinguishing between these transients to determine whether or not switching has occurred in the memory element. At least four different methods may be used to determine whether switching of polarization has occurred in a memory element. These are as follows:

(1) Since the switching transient has a larger amplitude, i.e., curve 17 is higher than curve 16, the excess amplitude 18 of curve 17 over curve 16 can be detected by clipping. Thus, a signal responsive to the presence of the excess amplitude portion 18 will be obtained only if switching occurs in the memory element 8 and there will be no signal if there has been no switching or "flip-flop" in the remanent polarization of memory element 8. This method of detecting whether or not switching has occured is utilized in connection with the basic circuits shown in Figs. 6 and 7, if resistance or capacitance or a combination of resistance and capacitance is used as the series load impedance 9.

(2) Fig. 8 shows that the area mounded by curve 17 is substantially larger than the area bounded by curve 16. One can take advantage of this difference between the switching transient and the elastic transient if an integrating type of load is used; in other words, if in the circuits shown in Figs. 6 and 7 the series load impedance 9 is a capacitance or a combination of a capacitance with a resistance or inductance.

(3) Another manner of determining whether switching occurs in the memory element is to provide a combined resistance capacitance as a load element in series with the memory element and connect a filter circuit across the load element. If the load element has the proper time constant and the filter circuit components are chosen correctly, the switching transient which occurs when polarization of the memory element is reversed will cause a relatively long duration signal to appear at the filter output. If switching does not occur, the filter circuit simply by-passes the short duration input pulse which did not switch the memory element and no signal appears at the filter output. This method results in an extremely favorable signal to noise ratio, for example, 300 to 1.

(4) Still another way to determine whether switching occurs in the memory element 8, and to obtain a signal from the memory element only when switching does occur, is to combine two electrical pulses in a non-linear load resistance having a sharp break in its dynamic characteristic so that the two pulses acting simultaneously cause the load resistance to have a certain resistance value different from the value it has when only one pulse is applied to the load resistance. Thus, the non-linear load resistance may be a diode, the input of a transistor, etc. having properties such that when two electrical pulses are applied to it simultaneously, the load resistance is in a low conducting, high-resistance state whereas when only one pulse is applied to the load resistance it is in a high-conducting, low-resistance state, or vice versa.

In practising the method according to (4) above to determine whether or not switching has occured in the memory element 8, a second electrical pulse is made to coincide with the switching transient represented by the curve 17 and more particularly with that portion of the area bounded by the curve which is indicated at 19 in Fig. 8. Since the area 19 is substantially free of the elastic transient 16, i.e., follows it late enough so that the elastic transient has substantially disappeared, a delayed pulse can be made to coincide with only the switching transient. Moreover, a signal will be obtained only if switching does occur since it is only then that the portion 19 of the transient curve will exist. Hence, the coincidence of pulses, i.e., one pulse being transformed into a switching transient pulse resulting from a "flip-flop" or change in the remanent polarization of the memory element 8 and the other pulse being supplied at a time late enough to coincide with a portion of the switching pulse, results in a very selective method of detecting whether or not switching has occurred in the memory element 8.

The method described in Fig. 4 above will be understood more fully by referring to Figs. 9–11 of the drawings. The circuit shown in Fig. 9 includes a memory element or condenser 20 which may be like the memory element or condenser 8 shown in Figs. 6 and 7 in that it is capable of reversing its remanent polarization in response to an applied electrical pulse of the proper sign, i.e., the memory element 20 comprises a material capable of "flip-flop" action. A diode 21 is in series with memory element 20 and can be considered as being a load resistance for the element 20. Diode 21 is biased by a voltage applied across the terminals 22 and 23, a resistance 24 being included in the circuit. The bias is such that diode 21 is in a high-conducting, low-resistance state. Furthermore, the bias is chosen to be somewhat higher than the voltage of the pulses which are applied across terminals 25 and 26.

Assuming now that a pulse 27 is applied across terminals 25 and 26, and that the remanent polarization of memory element 20 is such that a "flip-flop" or switching of remanent polarization occurs when pulse 27 is so applied, then diode 21 will be hit by two electrical pulses. One of these electrical pulses is the switching transient which occurs when memory element 20 is switched in its remanent polarization and the other electrical pulse is a pulse which arrives through the time delay line 28, the characteristic of the time delay line being such that the second pulse is delayed enough to coincide with that portion of the switching transient which is represented by the area 19 in Fig. 8. Coincidence of the two electrical pulses, one being the switching transient and the other being the pulse fed through the time delay line 28, causes the diode 21 to change into a low-conducting, high-resistance state and this causes a signal to appear across the output terminals 29. Resistance 30 is a series resistance for the time delay line 28 serving essentially the same purpose for the time delay line pulse as the resistance 24 serves for the bias on diode 21. 31 designates the characteristic impedance of the time delay line.

If the remanent polarization of memory element 20 is such that pulse 27 does not cause switching of the remanent polarization, i.e., the remanent polarization has the same electrical sign as does the applied pulse, then the applied pulse will cause only an elastic transient. By referring again to Fig. 8, it can be seen that the elastic transient will hit the diode 21 earlier than the delayed electrical pulse which is fed to diode 21 from time delay line 28. The two pulses are therefore not coinciding. Since the amplitude of pulse 27 is chosen to be somewhat less than the bias voltage applied to diode 21, the diode will not change to a low-conducting, high-resistance state if only one pulse hits it. Instead, it remains in its high-conducting, low-resistance state and no output signal will be obtained on terminals 29. It is thus apparent that this mode of reading enables the switching transient to be clearly distinguished from the elastic transient or, in other words, enables the ready determination of whether or not switching of polarization has occurred in the memory element 20.

The circuit shown in Fig. 10 is similar to that shown in Fig. 9 excepting that the two ends of the diode 21 are connected to the input of a bistable or monostable transistor circuit instead of being the output terminals of the circuit. Thus, referring to Fig. 10, voltage source 32 supplies bias to diode 21 and also supplies bias to the emitter circuit of the transistor 33. The resistor 24 serves also as the separating or decoupling resistor in the emitter circuit of transistor 33. Inductance 34 is a peaking inductance and tunes out the capacitance of this circuit. Resistance 35 is the base resistance of transistor 33, and voltage source 36 is the collector voltage source. Resistance 37 is the load resistance of the collector circuit. Terminals 38 and 39 are the output terminals on which the signal appears if switching occurs in memory element or condenser 20. Mono or bistable transistor circuits of the type just described are described in greater detail on page 1545 of Proceedings of the I.R.E. for November 1952, volume 40, and further description of this particular circuit is therefore deemed to be unnecessary.

Fig. 11 shows what can be described as an anti-coincidence circuit since, with this circuit, a signal is obtained across the output terminals if switching of polarization does not occur in the memory element 20 as contrasted with the Fig. 9 circuit where a signal is obtained only if switching of polarization does occur in the memory element. The Fig. 11 circuit is particularly useful for reading a memory element which has already been switched in its polarization so that the polarization of the memory element is the same as that of the applied reading pulses. Such a circuit makes it unnecessary to change the sign of the writing pulses in order to be able to read the circuit.

Referring more particularly to Fig. 11, it will be noted that the diode 40 shown there is connected in opposite direction from the diode 21 shown in Figs. 9 and 10. Also, the diode 40 is not biased as is the diode 21. Diode 40 is, however, similar to diode 21 in that it is a nonlinear load resistant element having a sharp break in its dynamic characteristic.

When a reading pulse 27 is applied across input terminals 25 and 26, a second pulse 42 of opposite polarity is derived from pulse 27 and is applied across terminals 41 and 26. Pulse 42 is delayed by time delay line 28 and is fed through resistance 30 to diode 40. Pulse 42, being a negative pulse, is opposite to the conductive direction of diode 40 as shown in Fig. 11. Therefore, if the positive reading pulse 27 which is simultaneously applied to terminals 26 and 25 does not cause switching of memory element 20, there will be only an elastic transient fed from memory element 20, i.e., a current corresponding to the curve 16 shown in Fig. 8. Since the elastic transient current is ahead of the delayed pulse 42 there is no coincidence of the pulses 27 and 42 and consequently pulse 42 appears across terminals 43 as an output signal. The pulse is not shorted by diode 40 since it is applied opposite to the conductive direction of the diode.

If, however, pulse 27 causes switching of polarity to occur in memory element 20, i.e., a switching transient to be produced, then negative pulse 42 will coincide with the switching transient. In fact, the positive switching transient, represented in Fig. 8 by 17, drives diode 40 into a low-resistance, high-conducting state and hence the diode actually creates a short across the output terminals 43. Therefore, the negative pulse 42 is incapable of producing a signal on the output terminals when switching of polarity occurs in memory element 20.

Figure 12:
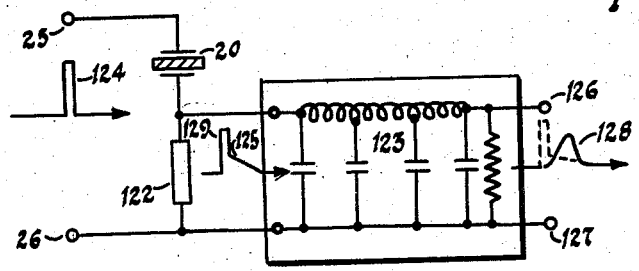
Fig. 12 shows a filter circuit according to another embodiment of my invention.

Referring to Fig. 12, the memory element 20 is shown as being connected in series with a load element 122. A filter circuit, indicated generally by the reference numeral 123, is connected across load element 122 as shown in Fig. 12. Load element 122 is preferably a combined resistance-capacitance load element having a very short time constant. For example, for ultra-high speed operation where the input pulse 124 may have a duration as short as a fraction of a microsecond, the time constant of load element 122 should be in the microsecond region.

The short time constant of load element 122 permits a switching transient, produced upon reversal of polarization of memory element 20, to pass into the filter circuit 123 as is shown occurring by pulse form 125. By proper design of the filter circuit, i.e., choosing the proper values for the component parts of the circuit as shown in Fig. 12, pulse 125 appears at the output terminals 126 and 127 as a relatively long duration output pulse 128. The extremely short duration portion of pulse 125, indicated at 129, has been by-passed or filtered out by circuit 123.

The operation described immediately above shows that short duration pulses which do not cause a reversal of polarity of memory element 20 will not appear as output signals across terminals 126 and 127. Where, however, the polarization of memory element 20 is switched and a resulting switching current transient flows through load element 122, a signal 128 appears across terminals 126 and 127 because of the time constant characteristics of load element 122 and the operation of filter circuit 123. I have found that a circuit according to Fig. 12 is capable of operation with pulses as low as $1/10$ of a microsecond in duration and that, in addition to detecting whether or not switching of polarization occurs in memory element 20, the circuit provides a signal to noise ratio as high as 300 to 1.

The circuits shown in Figs. 9–11 all show the memory element 20 as being directly associated with the coincidence circuit. In other words, the current transients produced by the memory element 20 in response to pulse actuation are fed directly to the coincidence circuit. However, if desired, the memory element 20 could be provided with a load such as the load 9 shown in Figs. 6 and 7 and the transients imposed on this load by the memory element could be fed to an amplifier, the amplifier output being fed into a coincidence circuit such as shown in Figs. 9–11. It is therefore apparent that Figs. 9–11 are representative of only some of the possible coincidence circuit arrangements to which a memory element may feed its electrical transient. It is further apparent that the diode 21 in Figs. 9 and 10 and diode 40 in Fig. 11 may be replaced by an equivalent type of circuit element having a sharp break in its dynamic characteristic curve as long as the equivalent element is capable of operating according to the manner of operation described above in connection with diodes 21 and 40.

In the basic circuits shown in Figs. 6 and 7, the memory element 8 has been described as being switched in polarization by a single input pulse 10. Likewise, in the coincidence circuits shown in Figs. 9–11, the memory element 20 has also been described as being switched in polarization by a single input pulse 27 even though, in the coincidence circuits, a delayed pulse may be derived from the input pulse. It is apparent therefore that the manner of recording and reproducing, which can be referred to as the manner of writing and reading, thus far described involves the application of a single pulse capable of causing switching of polarization of the memory element and is thus a single pulse writing or reading operation. However, the circuits shown in Figs. 6 and 7 and in Figs. 9–11 may also be operated according to a multiple pulse writing or reading operation. In other words, a single pulse alone does not completely switch the polarization of the memory element from pulse to minus but causes only a partial switch in polarization from more plus to less plus.

That this can be accomplished may be visualized by inspecting Fig. 5 which shows three different magnitude hysteresis loops for a memory element material. A pulse applied to a memory element may have a magnitude such that it is capable only of switching the remanent polarization of the element from $P'''_r$ to $P''_r$ or, in other words, will cause only a partial change in the polarization. However, even a partial change in polarization will produce a certain magnitude of switching transient and as long as the switching transient can be discriminated or detected against the elastic transient, according to one of the methods described hereinbefore, a signal can be obtained. Thus, partial switching of the remanent polarization of a memory element may be repeated successively until finally all of the remanent polarization has been switched completely to the opposite electrical sign. Obviously, in the process of successively switching the polarization, multiple output signals, or readings, are obtained.

Another method of reproducing or reading information stored in a memory element is to apply what may be termed a double pulse to said memory element wherein the double pulse consists of one pulse of one electrical sign and another pulse of opposite electrical sign derived from the first pulse. For example, a pulse of opposite electrical sign may be derived from another pulse by a suitable discriminating circuit. The application of such a double pulse would have the effect that, after the reproducing or reading pulse is initially applied to the memory element, it is followed shortly by an opposite polarity pulse which re-establishes the original state of polarization of the memory element. The memory element is, in effect, reset and the information stored therein is not destroyed.

Figs. 13 and 14 show circuits adapted for multiple pulse writing and reading, or recording and reproducing, operation. Fig. 14 shows a plurality of memory elements forming a matrix while Fig. 13 shows essentially one unit of the matrix shown in Fig. 14. Fig. 13 is therefore selected for description first.

Referring now to Fig. 13 specifically, it is seen that the memory element 44 is connected in series with a load element 45. Element 44 is an element comprising a material capable of being remanently polarized and of switching its polarization in response to a proper magniture of applied pulse or pulses. In other words, this element is similar to the elements 8 and 20 described above in connection with preceding figures and element 44, may, for example, comprise a ferroelectric material such as highly oriented barium titanate. Load 45 corresponds generally to load 9 shown in Figs. 6 and 7 and may be any suitable type of electrical load element such as a resistance, inductance, capacitance or combination thereof.

Element 44 is connected in parallel with two diodes 46 and 47. Diodes 46 and 47 are connected across lines 48 and 49 by switches 50 and 51. Switches 50 and 51 are preferably gang switches having a relative positioning such that when one switch is closed the other is open. In Fig. 13 switch 51 is shown as being closed while switch 50 is open.

When an electrical voltage is applied across input terminals 52 and 53 the particular diode connected across lines 48 and 49 will have a bias applied thereto through resistance 54. In the connection shown in Fig. 13, diode 47 is biased in its forward conducting direction and the magnitude of the bias supplied by the voltage across input terminals 52 and 53 is such as to cause the diode 47 to be in a high-conducting, low-resistance state. Obviously, as long as diode 47 is in this state it short circuits elements 44 and load member 45.

With diode 47 connected across lines 48 and 49 and being biased so as to be in a high-conducting, low-resistance state, it is possible to record, or write, intelligence or information into memory element 44 by a multiple coincidence writing operation. This is accomplished by feeding negative electrical pulses through line 55. Thus, a negative electrical pulse 56 is shown as being directed along line 57 and through resistance 58 to line 55. The bias across terminals 52 and 53 is chosen so that a single pulse such as pulse 56 is incapable of driving diode 47 into a low-conducting, high-resistance state. Therefore, the fact that pulse 56 travels to memory element 44 does not cause enough switching of the polarization of this memory element to cause an output signal to appear across the output terminals 59. However, if simultaneously with pulse 56 another negative pulse 60 travels along line 61 and through resistance 62 to line 55, the pulses 56 and 60 will then coincide and can overcome the bias imposed on diode 47 and drive this diode into a low-conducting, high-resistance state. This means that switching of polarization can occur in element 44 of a sufficient magnitude to cause a switching transient to flow through load element 45 and create an output signal across terminals 59.

The bias on diode 47 may be chosen so that it takes three coincident negative pulses to overcome the bias and cause sufficient switching and polarization of element 44 to cause a switching transient to flow through load element 45. Thus, in Fig. 13, still a third pulse may be made to flow along dotted line 63 and through dotted resistance 64 to line 55. It is apparent that, depending on the number of lines 57, 61 and 63 with associated circuit elements, a two or three dimensional memory matrix may be constructed. In other words, line 57 can be the X axis of a cubical type memory matrix, line 61 can be the Y axis of said matrix and the dotted line 63 can be the Z axis of the matrix.

Assuming that element 44 has had a sufficient number of negative pulses applied to it to cause it to be remanently polarized in one direction, which is another way of saying that a unit of information has been recorded or written into element 44, then the information may be reproduced or read out in the following manner. Switch 50 is closed and simultaneously switch 51 is opened. This connects diode 46 across lines 48 and 49. The bias applied across terminals 52 and 53 is reversed so that the positive voltage is now supplied along line 49 instead of along line 48. Positive pulses are then applied along lines 57 and 61, in other words, along the X axis and Y axis, these positive pulses being represented by the dotted pulses 65 and 66. The bias across diode 46 may be chosen so that pulse 65 or 66 alone is incapable of causing a switch in the remanent polarization of element 44 but the simultaneous application of these pulses will cause a sufficient switch in polarization to cause an output signal to appear across terminals 59. Also, it could take three positive pulses instead of two to cause the output signal. Therefore, if a signal is obtained across terminals 59 there is a unit of information obtained because there was a unit of information recorded in element 44 to be obtained. The memory feature of the apparatus is therefore apparent and the writing and reading or recording and reproducing is also apparent.

Fig. 14 shows a multiple memory element matrix which is made up of a plurality of circuits similar to the circuits shown in Fig. 13. Nine memory element circuits are shown in Fig. 14 but this is but an illustrative number and any practicable number of memory elements may be incorporated in such a matrix arrangement. Since the individual memory element circuits are identical only one individual memory element circuit is described in detail, it being understood that the other individual circuits are similarly constructed and arranged. The individual circuit at the lower left-hand portion of Fig. 14 is selected for detailed description.

Inasmuch as each individual memory element circuit is similar to the circuit shown in Fig. 13, corresponding reference numerals are used to designate the corresponding circuit components. Thus, referring to the lower left-hand portion of Fig. 14, memory element 44 is shown as being connected to resistances 58, 62 and 64 in similar manner as is shown in Fig. 13. The heavy lines shown in Fig. 14 represent rows and columns respectively and correspond to the X and Y axes shown in Fig. 13. Resistance 58 is therefore connected to one of the several heavy lines 67, this connection corresponding to the connection of resistance 58 to line 57 as shown in Fig. 13. Similarly, resistance 62 is connected to one of the several heavy lines 68, this connection corresponding to the connection of resistance 62 to line 61 in Fig. 13. Resistance 64 will be connected to one of several heavy lines, not shown, representing the Z axis of the memory matrix in manner corresponding to the showing in Fig. 13 where resistance 64 is connected to line 63.

In each of the unit circuits shown in Fig. 14, the memory element is shown as being associated with two diodes corresponding to diodes 46 and 47 shown in Fig. 13. The switches 50 and 51 shown in Fig. 13 have been omitted from Fig. 14 but it is to be understood that the switches will be arranged with respect to each group of diodes as shown in Fig. 13 where it is desired to utilize one diode for recording or writing and the other diode for reproducing or reading. This operation has been explained in connection with the circuits shown in Fig. 13 and the same operation will apply to Fig. 14 where it is desired to utilize both diodes. However, as will be explained more in detail later, diode 46 may be omitted in each of the unit circuits and only a single diode needed, provided the reproducing or reading operation is accomplished by an anti-coincidence circuit like that shown in Fig. 11.

All of the unit circuits of Fig. 14 may have a common source of bias for the diodes and a common load member. Thus, input terminals 52 and 53 are shown as being common to all of the unit circuits shown in Fig. 14, and, similarly, load member 45 is shown as being common to all of the unit circuits. The operation of the circuits shown in Fig. 14 for recording or writing intelligence or information into the memory matrix corresponds to the operation described in connection with Fig. 13.

A voltage, which may be in the form of a long duration pulse, is applied across terminals 52 and 53. This voltage biases all diodes 47 in the forward or conducting direction. If a single negative pulse 56 is applied to one of the rows 67, the magnitude of the bias voltage is such that the single pulse is incapable of causing a switching in polarization of memory element 44. However, if another negative pulse 60 is simultaneously applied to one of the columns 68, the two negative pulses 56 and 60 will coincide at the selected memory element or cross point which, in Fig. 14, is shown as being the memory element in the lower left-hand corner. All of the other memory elements connected to the selected row 67 and to the selected column 68 will have only a single pulse applied to them and this pulse is insufficient to cause a switching in polarization as previously explained. Memory element 44 in the lower left-hand corner of Fig. 14, since it has two coincident negative pulses applied to it, does have its remanent polarization switched and this causes a switching transient to flow to load 45. This switching transient would appear as a signal across output terminals 59 but, during recording or writing a diode 69 may be connected across load 45 to provide a low resistance path since the signals to be obtained from output terminals 59 are those during reproducing or reading rather than during recording or writing. As has been explained in connection with Fig. 13, switching of polarization of element 44 may require a triple coincidence of negative pulses, in which event the fact that two pulses 56 and 60 coincide on element 44 will be insufficient to cause switching in polarization and will require still another pulse through resistance 64 to cause switching and polarization. It is apparent that the number of pulses required to cause a switching of polarization of a given memory element can therefore be predetermined to be two, three or even more pulses. The fact that the matrix may be two or three dimensional means that there can be a random or sequential selection of memory elements or cross points in essentially one plane or in space for both recording or writing and reproducing or reading operation.

The reproducing or reading operation of the matrix shown in Fig. 14 can be accomplished in manner similar to that described in connection with Fig. 13. However, it can also be accomplished by utilizing an anti-coincidence output circuit in connection with load 45 as shown in Fig. 11. If an anti-coincidence arrangement is used for reproducing or reading, all of the diodes 46 may be omitted since both recording or writing and reproducing or reading may be accomplished with the single diode 47 in each of the unit circuits. During the reproducing or reading operation, diode 69 is operating in the back resistance direction across the output terminals 59. The reading pulses may have the same sign, i.e., be negative pulses like the writing pulses 56 and 60. All of the memory elements 44 which were switched in remanent polarization during the recording or writing operation will produce a signal on output terminals 59, if reproducing or reading pulses having the same electrical sign, i.e. negative pulses are applied to these memory elements during the reproducing or reading operation. Conversely, all memory elements which were not switched in remanent polarization during the recording or writing operation will not produce a signal at output terminals 59 if the same number of negative pulses are applied to these memory elements during the reproducing or reading operation. This has all been described in connection with the operation of circuit Fig. 11 and further description is deemed to be unnecessary.

Use of an anti-coincidence circuit arrangement in connection with a matrix such as is shown in Fig. 14 has the following advantages. All of the diodes 46 may be omitted so that there need to be only a single diode 47 associated with each memory element 44. The reproducing or reading pulses may have the same polarity as the recording or writing pulses. This means that it is unnecessary to change the compensating bias at terminals 52 and 53. Furthermore, the standby condition, or reset, may be achieved instantaneously by applying a reverse polarity bias pulse across terminals 52 and 53 and the entire matrix is reset to its original condition and ready for another recording or writing operation.

Figure 15:
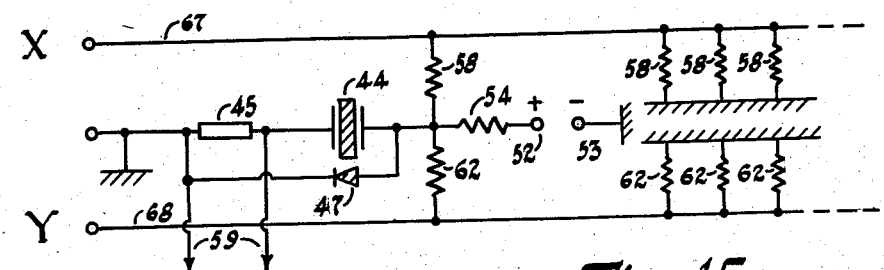
Fig. 15 shows the equivalent circuit of the three-dimensional memory matrix shown in Fig. 14.

Fig. 15 shows the equivalent circuit for the memory matrix shown in Fig. 14 where the matrix is two dimensional in nature, i.e., consists of a plurality of X rows 67 and Y columns 68. Fig. 15 shows that the impedance of all unselected memory elements or cross points 44 connected to the selection rows or columns, in this instance row 67 and column 68, can be regarded as grounded since the diodes are in a conductive state and the only elements remaining active are the matrix resistances 58 and 62. Thus, the input resistance of a selected row or column will be primarily a parallel combination of the resistances of the unselected memory elements or cross points.

Figure 16:
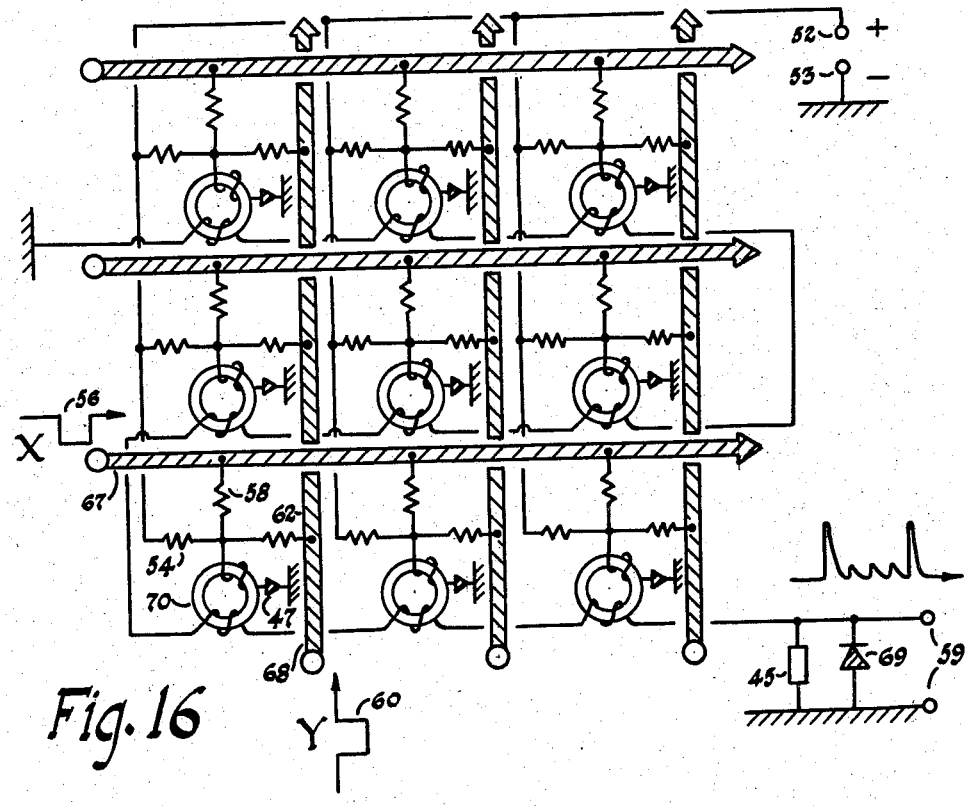
Fig. 16 is a view similar to Fig. 14 but including bistable magnetic members as cross-point members rather than bistable ferroelectric members as shown in Fig. 14.

In Fig. 14, memory element 44 is indicated as being a condenser element comprising a material capable of switching remanent polarization. Highly oriented ceramic material such as barium titanate has been previously mentioned as being a suitable dielectric for such a condenser. Fig. 16 shows a memory matrix similar to that shown in Fig. 14 in which the memory elements 44 are replaced by bistable ferro-magnetic members 70. These members 70 correspond to the condenser type elements 44 in that members 70 are capable of being remanently polarized, and switched in polarization substantially instantaneously by an applied electrical pulse to produce a switching transient capable of producing an output signal. Other than the substitution of ferro-magnetic element 70 for the condenser type elements 44, Fig. 16 is similar in construction and operation to Fig. 14 and hence further description is deemed unnecessary. Corresponding numerals have been applied to Fig. 16 to indicate corresponding parts to Fig. 14. Furthermore, Fig. 16 is shown as a two dimensional matrix, i.e., comprising rows and columns although it could incorporate a third dimension such as indicated by the resistances 64 in Fig. 14. The diodes 46 are omitted in Fig. 16 since it is assumed that this matrix is to be operated in conjunction with an anti-coincidence circuit of the type shown in Fig. 11 wherein it is possible to accomplish both recording or writing and reproducing or reading with diode 47 being associated with the memory element and the same sign electrical pulse being used for reading and writing.

Figure 17:
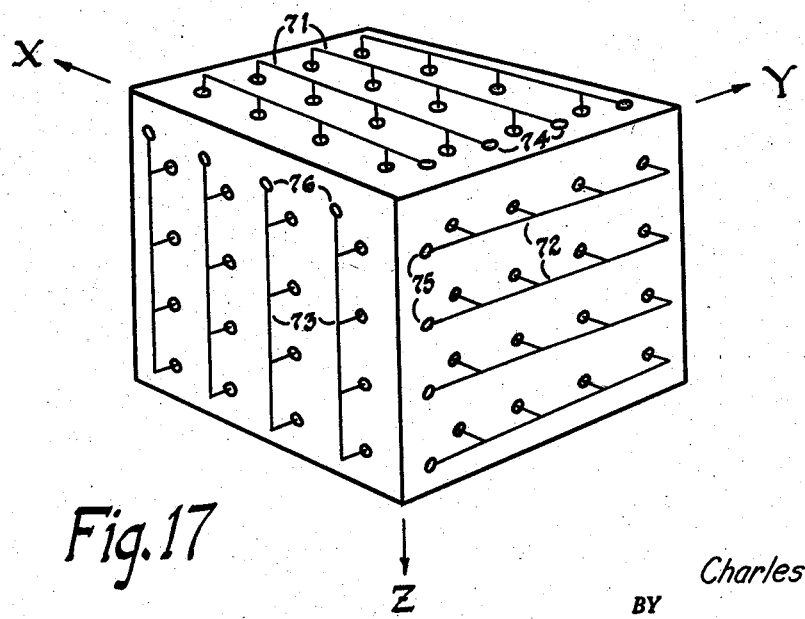
Fig. 17 is a schematic showing of a cubicle type memory matrix.

Fig. 17 is a representation of a cubical type memory matrix incorporating a plurality of horizontal rows 71, horizontal columns 72, and vertical columns 73. The horizontal rows 71 may be considered as corresponding to the Y axis columns 68 shown in the matrices of Figs. 14 and 16. Similarly, the horizontal columns 72 correspond to the vertical Z axis columns which are not specifically shown in heavy lines in Fig. 14 but which are to be understood as connected to the resistance 64 shown in that figure. Finally, the vertical columns 73 correspond to the X axis rows 67 shown in the matrices of Figs. 14 and 16. It is therefore apparent that, by providing a plurality of horizontal rows and horizontal and vertical columns, a memory matrix may be built up in the form of a cube which can incorporate a vast number of memory elements or cross points 44, each of which will provide a seat for storing information and which seat may be acted upon to put information into it and take information from it. Thus, pulses may be applied to the input ends 74 of rows 71, to the input ends 75 of horizontal column 72, and to the input ends 76 of vertical columns 73 in accordance with any selection desired to achieve a given recording or writing of information and to then subsequently reproduce or read out the information recorded. The cubical shown in Fig. 17 is thus in the nature of a memory box which, like a brain, can store information.

In order to record or write intelligence or information in a memory matrix of the type shown in Figs. 14 and 16 and to reproduce or read from the matrix, it is preferable to utilize a scanning circuit which is adapted to transmit electrical pulses to all of the memory elements in the matrix. In stating that the scanning circuit should be capable of transmitting pulses to all of the memory elements, it is to be understood that this does not mean that the pulses will always be simultaneously applied to all memory elements.

Figures 18, 20:
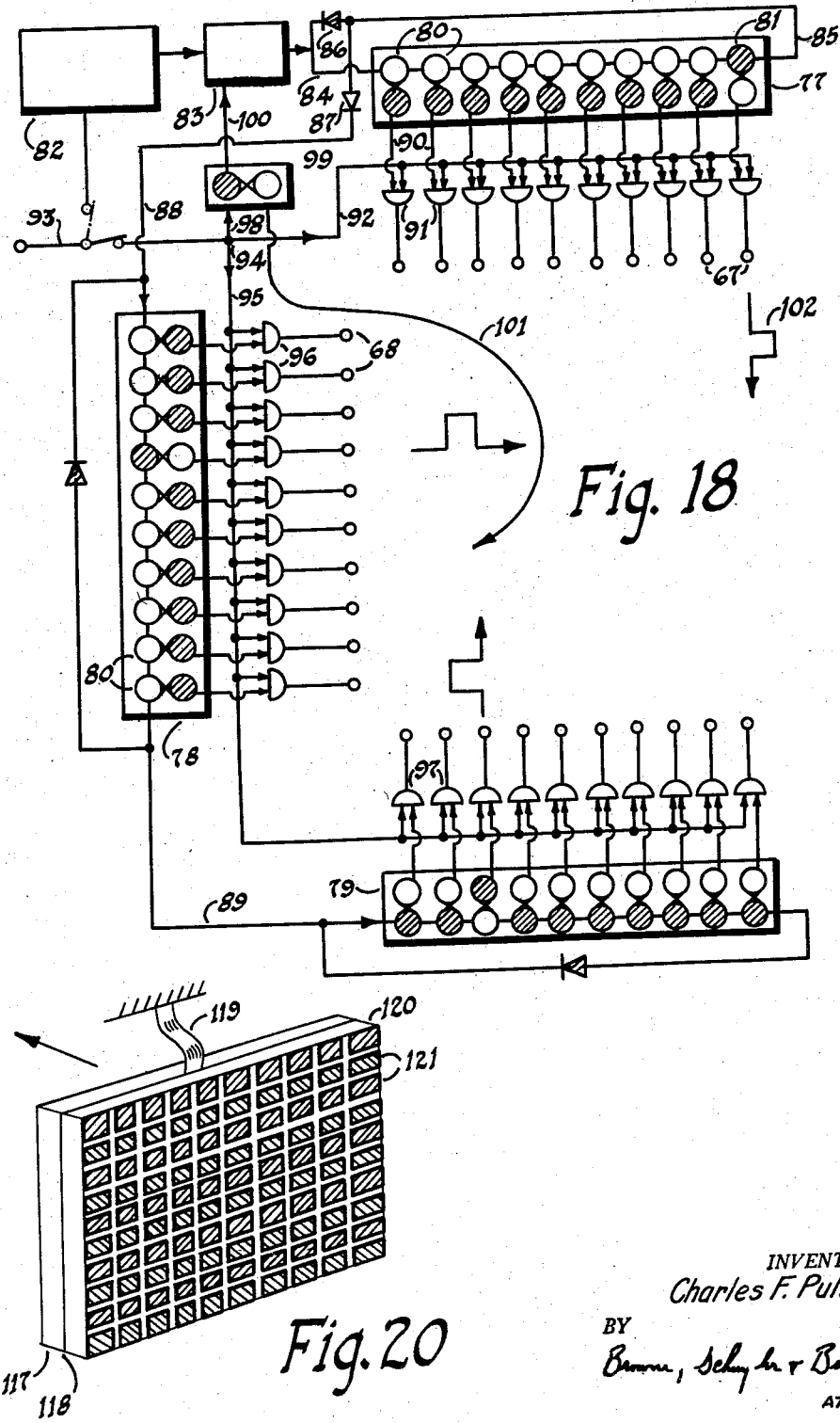
Fig. 18 is a schematic showing of a sequential type scanning circuit adapted for use with a memory matrix according to my invention.
Fig. 20 is a schematic showing of a visual type memory matrix according to another embodiment of my invention.

Fig. 18 shows one embodiment of a scanning circuit which is adapted to scan sequentially memory elements in a memory matrix. In the particular arrangement shown in Fig. 18, means are provided to scan a three dimensional matrix. Referring more specifically to Fig. 18, it will be noted that the scanning circuit includes three flip-flop decade rings indicated generally by the numerals 77, 78 and 79. Each decade ring comprises 10 flip-flop elements 80, these elements being of the type known to those skilled in the computer art wherein the elements flip over in step by step fashion sequentially as pulses are supplied to the input of the decade ring. In other words, in decade ring 77, elements 80, starting from the left, progressively flip over to cause electrical pulses to be produced by each flip-flop, displaced from left to right along the ring. In ring 77 the right-hand flip-flop element 81 is shown as being flipped over to open the circuit at that location for transmission of an electrical pulse to a particular terminal as is later described.

The decade rings are connected to a master oscillator 82 which is adapted to feed high-speed electrical pulses through a gate circuit indicated by the reference numeral 83. From the gate circuit the pulses are fed to lead 84, which is in turn connected to the input of the flip-flop decade ring elements 80. A lead 85 extends from the end flip-flop element 81 and is connected to a diode 86, which is in turn connected to lead 84 and lead 85 is also connected to a diode 87 which is connected to a lead 88. Lead 88 is the input lead to the second decade ring 78. Similarly, lead 89 is the input lead to the third decade ring 79.

The first decade ring 77 is connected by a plurality of leads 90 to a number of "and" circuits 91. There is an "and" circuit 91 for each flip-flop element 80. These "and" circuits, which may also be called gate circuits, are of the type known to those skilled in the computer art wherein the circuit conducts or delivers an output pulse to an output terminal if it receives one input pulse and another input pulse simultaneously. It will not deliver an output pulse if it receives only one input pulse.

Each of the "and" circuits 91 is connected to a common lead 92 which, in turn, is connected to input lead 93. Input lead 93 extends to a common terminal 94 from which a lead 95 extends to gate circuits 96 associated with the second decade ring 78 and gate circuits 97 associated with the third decade ring 79. Another lead 98 extends from common terminal 94 and is connected to a flip-flop element 99 from which an output lead 100 extends to gate circuit 83. Flip-flop element 99 may be controlled, in any suitable manner known to those skilled in the art, by a reset lead 101 so that element 99 will be opened or closed to allow a signal to go from input lead 93 to gate circuit 83 when desired. It is thus possible to set element 99 so that the gate circuit 83 is not operative to allow pulses to pass through it from master oscillator 82 except for a specific portion of the memory matrix. In other words, the gate circuit may be operative only for a fraction of the total number of memory elements that are in the matrix. It is therefore possible to record information in this fraction of the matrix and reproduce the recorded information without having to scan the entire matrix.

In the operation of the sequential scanning system shown in Fig. 18, master oscillator 82 is energized to deliver uniformly spaced apart pulses at whatever practicable frequency is chosen. For example, oscillator 82 may be operated at one megacycle whereby it delivers a pulse every microsecond. When oscillator 82 is going the scanner may be started by applying an input pulse or pulses to input lead 93. The first pulse fed to input lead 93 will pass through element 99 if this element is set to allow it to pass and will actuate gate circuit 83 to open the gate and allow pulses to proceed from master oscillator 82 to decade ring 77. The first pulse delivered from oscillator 82 will thus be synchronized with the first input pulse to lead 83.

As pulses proceed from oscillator 82 to decade ring 77 elements 80 successively flip over until ten steps have been made in the decade ring. Each time that a pulse hits the input of the decade ring an element 80 flips over and permits a pulse to hit one particular "and" circuit 91 associated with the element. The latter circuit will not, however, deliver an output pulse unless two pulses hit it. Therefore, if simultaneously with the flip over of an element 80, a pulse from input lead 93 hits the particular "and" circuit 91 associated with the particular element that is being flipped then there will be two pulses appearing on the particular "and" circuit 91 and a pulse will be delivered to one of the input terminals of the memory matrix.

Inasmuch as decade ring 77 may be considered as the X axis decade ring, the "and" circuits are shown as being connected to input terminals 67 of the matrix shown in Fig. 14. Furthermore, in Fig. 18, the right-hand flip-flop element 81 is shown as being in position to allow a pulse to proceed to the "and" circuit 91 connected to element 81. It is further assumed that at this particular instant which could be, for example, 10 micro-seconds from the start of the operation, a pulse from input lead 93 has coincided with the pulse conducted through element 81 and is causing an output pulse 102 to be delivered to one of the input leads 67.

Each time that pulses propagate along the first decade ring 77, a pulse is delivered to lead 85 and proceeds through diode 87 to lead 88 which is the input lead to the second decade ring 78. Each time that a pulse does enter the second decade ring 78 it causes the flip-flop elements 80 to progressively flip over in step-wise fashion as occurs in the first decade ring 77. Furthermore, each time that a particular flip-flop element flips over, the gate circuit 96 associated with the flipped element is biased so as to permit an input pulse to pass coming from input lead 93. Therefore, if a pulse from input lead 93 appears on lead 95 simultaneously, then the particular gate circuit will deliver an output pulse. In the example shown, it can be assumed that the second decade ring is delivering along the Y axis and, for the matrix shown in Fig. 14, can be connected to input leads 68. An output pulse is shown as being delivered to the fourth lead 68, starting from the top, since the fourth flip-flop element 80 is open and it is assumed that both a scanning pulse and an input pulse have coincided at the fourth gate circuit 96.

The operation of the third decade ring 79 is similar to the operation of the second decade ring 78. It is therefore apparent that the over-all operation of the arrangement is such that the first decade ring 77 makes ten steps and then resets itself, through lead 85, for the next set of ten steps. When it completed its first set of ten steps it delivered a pulse to the second decade ring causing this decade ring to shift one step. When the second decade ring is so shifted, the first decade ring does another ten steps and so on until all ten elements of the second decade ring have stepped over to complete ten steps for this ring. This causes one shift in the third decade ring. It is therefore apparent that the third decade ring shifts for each hundred steps taken by the first decade ring while the second decade ring shifts for each ten steps taken by the first decade ring. In this way the entire matrix can be scanned and an output pulse will be delivered to the matrix leads, such as 67 and 68, whenever an input pulse from lead 93 coincides with a scanning pulse.

In utilizing the sequential scanning system shown in Fig. 18 to reproduce or read out information stored in a memory matrix, the input lead 93 is connected directly to oscillator 82 so that the reading pulses supplied to input lead 93 will go into the oscillator and be combined with oscillator pulses fed to the flip-flop decade ring elements 80. In Fig. 18 the switch 93a will be thrown to the dotted line position to accomplish this. With such a connection there will be a continuous pulse sequence applied to the matrix terminals.

Figure 19:
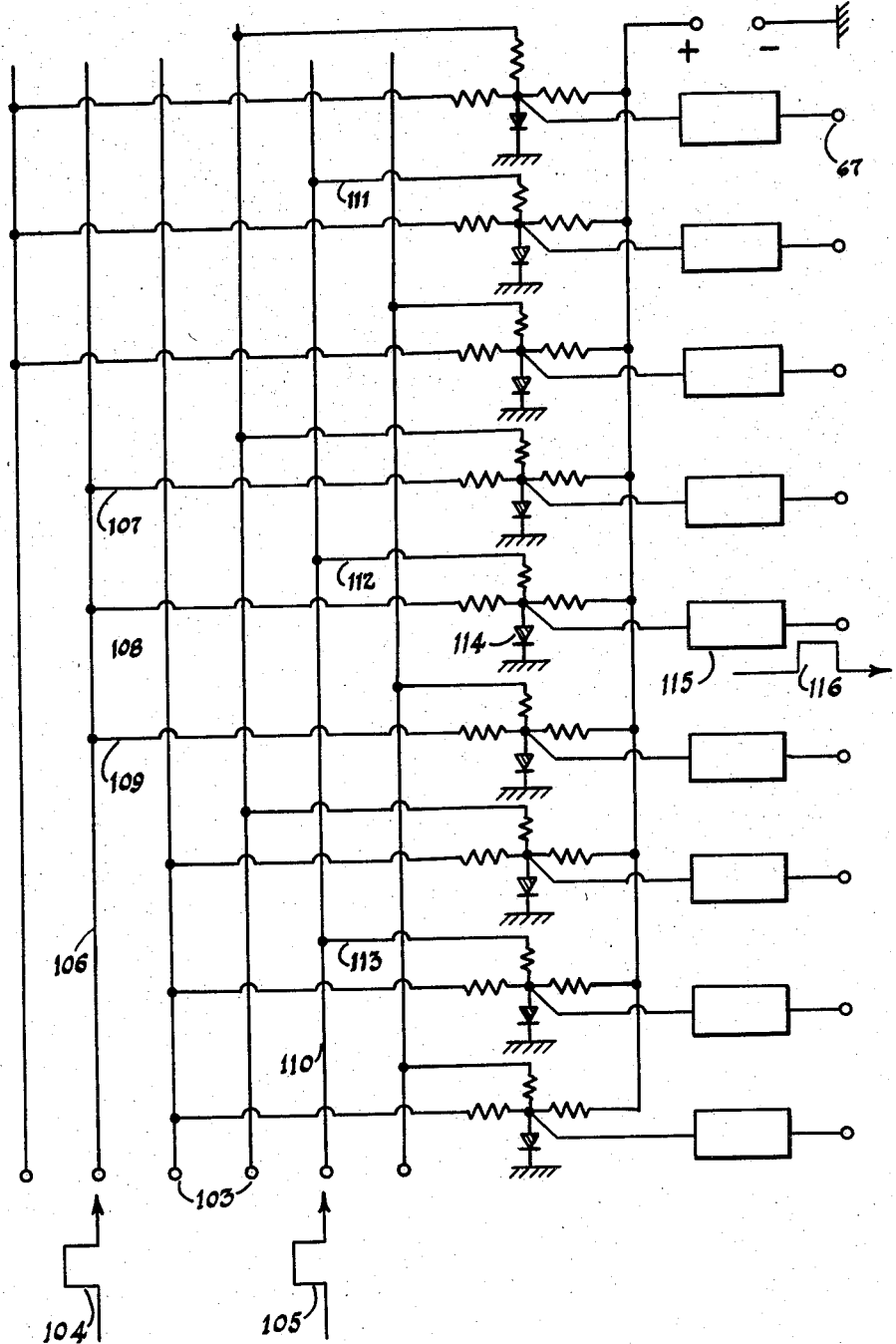
Fig. 19 is a schematic showing of a random scanning means adapted for use with a memory matrix according to my invention.

Instead of using a sequential scanning system as shown in Fig. 18, a random scanning system may be used as shown in Fig. 19. This type of system works on the principle, as is known to those skilled in the computer art, that a large number of input terminals can be controlled by a smaller number of input leads where binary or ternary signals are simultaneously applied to the input control leads. Thus, in Fig. 19 the input terminals are shown as being terminals 67 of the matrix shown in Fig. 14 and nine terminals are actually shown in Fig. 19. These nine terminals may be controlled by six input control terminals 103 as is known to those skilled in the art. In the example shown in Fig. 19, a pulse 104 is shown as being applied to the second input control terminal 103, starting from the left, and a pulse 105 is shown as being simultaneously applied to the fifth terminal 103. Pulse 104 travels along lead 106 which is connected to three leads 107, 108, and 109. Similarly, pulse 105 travels along lead 110 which is connected to three leads 111, 112 and 113. The various leads 107–109 and 111–113 are connected through suitable resistances to a plurality of diodes 114. Where two pulses coincide and are fed to a particular diode 114 an output signal will be fed through a suitable circuit 115 associated with each diode to one of the matrix input terminals 67. Thus, in the example shown, pulses 104 and 105 combine on a diode 114 since leads 108 and 112 lead to a common diode and thus cause an output pulse 116 to be delivered to an input terminal 67 as shown in Fig. 19. Further description of the random scanning circuit is deemed to be unnecessary since the operation of this type of scanner in general is similar to the multicoincidence matrix described in connection with Fig. 14.

For recording and reproducing coded information, it may be desirable to use a combination of sequential scanning with random scanning. These two scanning methods can be combined so that the "and" circuits shown in Fig. 18 can be driven simultaneously, or in any desired time sequence, by a sequential and random scanning device to permit a complete coding of information being recorded. If such coded or randomized information is transmitted in another memory matrix or transmitter, the information can later be decoded by using the same random reading code.

Fig. 20 shows schematically an arrangement for providing a visual indication of selected cross points of a memory matrix. This arrangement can be useful, for example, in providing a visual indication of graphical data used in computing operations.

Fig. 20 actually shows a perspective view with the rear side of the apparatus being to the front. This type of indicator comprises a conductive layer 117 which will preferably be a conductive glass layer since it is desired to be able to observe light through the front layer 117.

The layer 117 may actually be clear glass with a transparent or translucent conductive film 118 spread entirely over its inner surface, said film being grounded by a lead 119. The conductive film or thin layer 118 may be coated with any suitable film or layer such as a phosphor containing film or layer 120 which will give off light when electrically activated. This phosphor containing layer 120 is covered on one side, as shown in Fig. 20, with a plurality of metal spots 121. It is therefore apparent that there will be a portion of the phosphor containing film or layer 120 between each metal spot 121 and conductive film 118 and that electrical current may pass through that portion of layer 120, if an electrical potential is applied to the metal spot. Each metal spot 121 will be connected in a matrix such as the matrix shown in Fig. 14 and will actually replace the bistable elements 44 of the matrix.

The operation of the visual indicator arrangement of Fig. 20 corresponds in general to operation of the matrix shown in Fig. 14 in that pulses can be applied selectively to various conductive spots 121 just as pulses are applied selectively to elements 44 in the matrix shown in Fig. 14. The Fig. 20 arrangement therefore provides an ultra-high speed visual indicating screen adapted to be driven by pulses in the microsecond range. In view of the high speed operation desired the metal spots 121 will preferably be connected to transistors which will be incorporated in the matrix arrangement. Printed circuits may be utilized in constructing such an arrangement.

While I have described and illustrated embodiments of my invention, I wish it to be understood that I intend to cover all modifications thereof which would be apparent to one skilled in the art and which come within the spirit and scope of my invention.

What I claim is:

1. An apparatus for recording and reproducing intelligence comprising a bistable dielectric element capable of being remanently polarized in one direction by an applied electrical pulse of one electrical sign and of having its remanent polarization reversed in response to an applied electrical pulse of opposite electrical sign, a load impedance connected in series with said bistable element, and a visual indicating device connected electrically across said load impedance, said indicating device being responsive to voltage developed across said load impedance to give a visual indication each time that the remanent polarization of said bistable element is reversed.

2. An apparatus for recording and reproducing intelligence comprising a bistable dielectric element capable of being remanently polarized in one direction by an applied electrical pulse of one electrical sign and of having its remanent polarization reversed in response to an applied electrical pulse of opposite electrical sign, a load impedance connected in series with said bistable element, and a visual indication circuit connected electrically across said load impedance, said indication circuit including a gaseous discharge tube, and biasing means connected to said gaseous discharge tube and biasing said tube close to its ignition potential, said tube being responsive to voltage developed across said load impedance to give a visual indication when the remanent polarization of said bistable element is reversed.

3. An apparatus according to claim 2 in which said indication circuit also includes a semi-conductor amplifier.

4. An apparatus for recording and reproducing intelligence comprising input leads, a bistable dielectric element and a load impedance connected in series across said input leads, said bistable element being capable of being remanently polarized in one direction by an applied electrical pulse of one electrical sign and having its remanent polarization reversed in response to an applied electrical pulse of opposite electrical sign, and a filter circuit connected electrically to said load impedance, said filter circuit being responsive to reversal of polarization of said bistable dielectric element to produce an output pulse having a predetermined duration.

5. An apparatus for recording and reproducing intelligence comprising a bistable dielectric element capable of being remanently polarized in one direction by an applied electrical pulse of one electrical sign and of having its remanent polarization reversed in response to an applied electrical pulse of opposite electrical sign, a non-linear load element connected in series with said bistable element, said load element having a dynamic characteristic curve with an extremely sharp break therein, a filter circuit connected electrically across said load element, and output leads connected across and extending from said load element, said filter circuit being responsive to reversal of polarization of said bistable dielectric element to produce an output pulse having a predetermined duration.

6. An apparatus according to claim 5 in which said load element is a diode connected in series with said bistable element.

7. An apparatus for recording and reproducing intelligence comprising input leads, a ferroelectric bistable element and a non-linear load element connected in series across said input leads, said bistable element being capable of being remanently polarized in one direction by an applied electrical pulse of one electrical sign and of having its remanent polarization reversed in response to an applied electrical pulse of opposite electrical sign, said non-linear load element having a dynamic characteristic curve with an extremely sharp break therein, a time delay line having its input side connected across said input leads and its output side connected across said load element, and output leads connected across and extending from said load element.

8. An apparatus according to claim 7 in which said load element is a diode connected in series with said bistable element.

9. An apparatus according to claim 7 having a circuit including a semi-conductor amplifier connected across said output leads.

10. An apparatus for recording and reproducing intelligence comprising a plurality of input leads, a bistable dielectric element capable of being remanently polarized in one direction by an applied electrical pulse of one electrical sign and of having its remanent polarization reversed in response to an applied electrical pulse of opposite electrical sign, said bistable element being connected to each of said input leads, a load impedance connected in series with said bistable element, a non-linear circuit element connected in parallel relation with said series circuit consisting of said bistable element and said load impedance, and output leads connected across and extending from said load impedance.

11. An apparatus according to claim 10 in which said non-linear circuit element is a diode.

12. An apparatus for recording and reproducing intelligence comprising a first set of electrically conductive strips located substantially in a common plane, a second set of conductive strips also located substantially in a common plane slightly spaced from said first mentioned plane, said respective sets of strips being disposed with respect to each other to form a grid and thereby define a plurality of cross-points, there being a cross-point at each location where a strip of one set crosses over a strip of the other set, a ferroelectric bistable element located at each of said cross-points, said bistable element being capable of being remanently polarized in one direction in response to an applied electrical pulse of one electrical sign and of having its remanent polarization reversed in response to an applied electrical pulse of opposite electrical sign, said bistable element being connected to each of the conductive strips defining the cross-point where said element is located, a common load impedance connected electrically in series with each of said bistable elements, and a diode located at each cross-point, each diode being connected in electrically parallel relation with respect to the series circuit formed by the common load impedance and the bistable element located at the cross-point where the diode is located.

13. An apparatus according to claim 12 including a third set of electrically conductive strips located substantially in a common plane positioned substantially at right angles to the planes in which said first and second sets of strips are located to thereby form a three dimensional matrix, each cross-point being formed by three conductive strips and the bistable element at each cross-point being connected to each of said conductive strips.

14. An apparatus for recording and reproducing intelligence comprising a plurality of bistable dielectric elements each capable of being remanently polarized in one direction by an applied electrical pulse of one electrical sign and of having its remanent polarization changed response to an applied electrical pulse of opposite electrical sign, means electrically connecting one side of each of said bistable elements in common, a common load impedance connected electrically in series with said common connecting means, a switching matrix, means connecting the other side of each of said bistable elements to said switching matrix, a plurality of non-linear circuit elements corresponding in number to the number of said bistable dielectric elements, there being a non-linear circuit element associated with each bistable dielectric element and said associated non-linear circuit element being connected in electrically parallel relation with respect to the common load impedance and the bistable element with which said non-linear circuit element is associated, each non-linear circuit element having a dynamic characteristic curve with an extremely sharp break therein.

15. An apparatus for recording and reproducing intelligence comprising a bistable dielectric element capable of being remanently polarized in one direction by an applied electrical pulse of one electrical sign and of having its remanent polarization changed in response to an applied electrical pulse of opposite electrical sign, a visual indicating device connected electrically in series with said bistable element, and an electrical impedance member connected electrically to both said bistable element and said visual indicating device, said visual indicating device being operative to give a visual indication when the remanent polarization of said bistable element is changed in response to an applied electrical pulse of said opposite electrical sign.

16. An apparatus for recording and reproducing intelligence comprising a bistable dielectric element capable of being remanently polarized in one direction by an applied electrical pulse of one electrical sign and of having its remanent polarization changed in response to an applied electrical pulse of opposite electrical sign, a visual indicating device connected electrically in series with said bistable element, an electrical impedance member connected electrically to both said bistable element said visual indicating device, and an electrical biasing means electrically connected to said impedance member, said biasing means being operative to provide an electrical bias to both said visual indicating device and said bistable element.

17. An apparatus for recording and reproducing intelligence comprising a ferroelectric bistable element capable of being remanently polarized in one direction by an applied electrical pulse of one electrical sign and of having its remanent polarization changed in response to an applied electrical pulse of opposite electrical sign, a visual indicating means electrically connected to said ferroelectric element, and electrical biasing means electrically connected to both said ferroelectric element and said visual indicating means, said ferroelectric element and said visual indicating means being so connected electrically that both said ferroelectric element and said visual indicating means may be energized from a common source of electrical energy.

18. An apparatus for recording and reproducing intelligence comprising a plurality of bistable dielectric elements each capable of being remanently polarized in one direction by an applied electrical pulse of one electrical sign and of having its remanent polarization reversed in response to an applied electrical pulse of opposite electrical sign, means electrically connecting one side of each of said bistable elements in common, a common load impedance connected electrically in series with said common connecting means, a switching matrix, means connecting the other side of each of said bistable elements to said switching matrix and a plurality of non-linear circuit elements corresponding in number to the number of said bistable dielectric elements, there being a non-linear circuit element electrically connected to each bistable dielectric element and each non-linear circuit element having a dynamic characteristic curve with an extremely sharp break therein.

19. An apparatus according to claim 18 in which said bistable element comprises recrystallized highly oriented dielectric material having ferroelectric properties.

20. An apparatus according to claim 14, in which said non-linear circuit element is a diode.

References Cited in the file of this patent

UNITED STATES PATENTS

| | | |
|---|---|---|
| 2,268,441 | Bosau | Dec. 30, 1941 |
| 2,468,065 | Hartley | Apr. 26, 1949 |
| 2,540,654 | Cohen | Feb. 6, 1951 |
| 2,582,480 | Dimond | Jan. 15, 1952 |
| 2,602,116 | Skillman | July 1, 1952 |
| 2,606,243 | Lesigne | Aug. 5, 1952 |
| 2,614,167 | Kamm | Oct. 14, 1952 |
| 2,618,697 | Metcalf | Nov. 18, 1952 |
| 2,666,195 | Bachelet, et al. | Jan. 12, 1954 |
| 2,695,296 | Anderson | Nov. 23, 1954 |
| 2,695,398 | Anderson | Nov. 23, 1954 |
| 2,717,372 | Anderson | Sept. 6, 1955 |
| 2,736,880 | Forrester | Feb. 28, 1956 |
| 2,808,578 | Goodell et al. | Oct. 1, 1957 |